3,261,976
FLUID FLOW MEASUREMENT METHOD USING A RADIOACTIVE TRACER MATERIAL
Donald E. Hull, San Rafael, Calif., assignor to Chevron Research Company, a corporation of Delaware
No Drawing. Filed Dec. 1, 1961, Ser. No. 156,499
1 Claim. (Cl. 250—43.5)

This invention relates to an improved method for measuring fluid flow rates with the aid of radioactive tracer materials.

U.S. Patents 2,826,699 and 2,826,700 describe method and apparatus for measuring the rate of fluid flow using radioactive materials, which is growing in use and which has become generally known as the "total count method."

While the total count method, as described in the patents above have referred to, provides an excellent means for measuring the rate of fluid flow in a variety of situations where reasonably accurate measurement would be extraordinarily complicated or prohibitively expensive by other methods, there are situations in which the total count method, if it is to be used, requires the employment of extraordinarily large quantities of radioactive material.

It is the object of this invention to provide a method for measuring fluid flow rate through the employment of radioactive materials in which very much smaller amounts of radioactive material are required in connection with the measurement than would be required if the total count method were employed.

It is a further object of this invention to provide a method for measuring extraordinarily high fluid flow rate through the employment of radioactive materials in quantities that permit handling by techniques customary in the field of isotope engineering. It is a further object of this invention to provide a method for measuring fluid flow to a much higher degree of accuracy than is ordinarily accomplished through the employment of radioactive materials, with quantities that permit handling with usual techniques.

Pursuant to this invention, the counting efficiency F, of the radioactivity counter is determined in counts/unit time per unit of radioactivity/unit volume using a known radioactive standard in the determination. A known quantity of radioactive material is introduced into the fluid stream of which the flow rate is to be determined. A sample is withdrawn from the fluid stream at a point downstream from the point of introduction of the radioactive material. The withdrawal of the sample is carried out at a constant rate and is continued for a measured time which includes the time during which all of the introduced radioactive material passes the withdrawal point. The sample is then thoroughly mixed and the radioactivity counter is filled with a portion of the sample. Its activity is determined in counts/unit time.

The rate of flow of the fluid stream is then determined according to the following formula:

$$Q = AF/RT$$

where Q is the rate of flow of the fluid, A is the quantity of radioactive material introduced into the fluid stream, expressed in millicuries or other units of radioactivity, F is the counting efficiency of the radioactivity counter determined as described in Patents 2,826,699 and 2,826,700 and expressed in counts per second per millicurie (or whatever unit is used to express the value of A) per unit volume, R is the number of counts per unit time of the sample collected recorded by the same counter, and T is the time during which the sample is collected.

The method of the invention was employed in measuring the flow of water in a refinery heat exchanger. Cobalt-60, in the form of the compound $Na_3Co(CN)_6$, was used as the radioactive tracer. The quantity of cobalt employed in the measurement was 306 microcuries. This quantity was infused into the line leading into the heat exchanger, and a sample was withdrawn from the line coming out of the exchanger. The sample was withdrawn at a constant rate in three equal parts, each of the three equal parts being the quantity of water collected in each of three immediately succeeding 50-second intervals, approximately 4 gallons. Each of these was counted in the same cylindrical container with a Geiger counter at the axis of the cylinder. The liquid capacity of the counting cylinder was about 2.5 gallons. The first part of the sample had a counting rate of 49.0 counts/second; the second part 8.5 counts/second; and the third part 7.4 counts/second, the same as a background rate with water taken from the plant before the test. The first part of the sample, therefore, was from the part of the stream which contained most of the radioactive material. The second part contained a little, but the third part contained none of the radioactive material.

To calculate the flow rate, the counting rates of the first and second parts of the sample, after subtraction of the background, were added together, because if all the radioactive material had been present in the part of the stream represented in one part of the sample, such part would have had a counting rate equal to the sum of the observed counting rates of the separate parts. The rate of fluid flow Q was calculated with the formula $$Q = AF/RT$$

In this test, the value of A was 306 microcuries; the value of F was 13,230 counts/minute per microcurie/gallon; the value of R was 42.7 counts/second; and the value of T was 50 seconds. (If the first two parts of the sample are mixed together the count rate R is 21.3 and the time T is 100 seconds.) From these values, the value of Q was found to be 1900 gallons/minute. Because 20,000 counts were accumulated in counting the most radioactive part of the sample, the accuracy of this flow rate was ±20 gallons/minute.

The flow rate of the same stream through this heat exchanger was measured immediately afterward by the total-count method. The same amount of cobalt tracer was used, and a flow rate of 1920 gallons/minute was found. However, only 2110 counts were accumulated in the same counter while the radioactive material passed through, and, consequently, the accuracy in the result obtained by the total-count method was ±60 gallons/minute. It can be seen that to attain the same accuracy in the total-count method as was attained in the method of this invention would have required approximately 10 times as great a quantity of radioactive material.

In a total count measurement, the total number of counts may be thought of as the product of the time required for the passage of the tracer and the average counting rate during that time. The statistical accuracy is limited to that defined by the total number of counts recorded; after the tracer has passed there are no more rays to count. In the method of this invention, counting of the sample can be continued as long as desired to determine R with any necessary statistical precision.

Suitable radioactive materials which may be employed are cesium-134, cesium-137, gold-198, antimony-124, cobalt-60, krypton-85, iodine-131, and tritium. These materials may be used as compounds which are soluble or uniformly dispersible in the fluids sought to be measured. The amount of radioactive material required for a test may range from a few microcuries to a number of curies, depending upon the volume of the flow and the purpose of the test. Any conventional radiation counter may be used in the practice of the invention, i.e., a Geiger counter, proportional counter, or either crystal or liquid scintillation counters.

The sample withdrawn for counting should be withdrawn from the fluid stream at a point sufficiently well downstream from the point at which the radioactive material was introduced that uniform mixing of the radioactive material with the fluid stream laterally is assured; further, the sample should be withdrawn at a uniform rate and the time during which the sample is collected must be accurately measured in order to obtain best results.

Having described the invention, I claim:

The method of determining the flow rate of a fluid stream, which comprises determining F, the counting efficiency of a radioactivity counter expressed in counts/unit time per unit radioactivity/unit volume, introducing a quantity A units of radioactive material into said fluid stream, withdrawing and collecting a sample of said fluid from said fluid stream at a point downstream from the point of introduction of said radioactive material, the withdrawal being at a constant rate and continuing for a time T, which includes the time during which the introduced radioactive material passes the withdrawal point, determining the number of counts per unit time R, of the collected sample detected by said radioactivity counter, and determining the flow rate Q of said fluid stream according to the formula:

$$Q = AF/RT$$

References Cited by the Examiner
UNITED STATES PATENTS

| | | | |
|---|---|---|---|
| 2,826,699 | 3/1958 | Hull | 250—43.5 |
| 2,826,700 | 3/1958 | Hull | 250—43.5 |
| 2,957,989 | 10/1960 | Hull | 250—43.5 |

RALPH G. NILSON, *Primary Examiner.*

FREDERICK M. STRADER, *Examiner.*

W. F. EINDQUIST, *Assistant Examiner.*